(12) United States Patent
Takaba

(10) Patent No.: US 7,668,063 B2
(45) Date of Patent: Feb. 23, 2010

(54) OPTICAL DISK DEVICE

(75) Inventor: Sadayuki Takaba, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 513 days.

(21) Appl. No.: 11/526,667

(22) Filed: Sep. 26, 2006

(65) Prior Publication Data

US 2007/0070835 A1 Mar. 29, 2007

(30) Foreign Application Priority Data

Sep. 26, 2005 (JP) .............................. 2005-278484

(51) Int. Cl.
 *G11B 7/00* (2006.01)
(52) U.S. Cl. ................. 369/59.21; 369/59.11
(58) Field of Classification Search ........................ None
See application file for complete search history.

(56) References Cited

U.S. PATENT DOCUMENTS

| 7,167,432 B2 * | 1/2007 | Chiang et al. | 369/59.19 |
| 2002/0105873 A1 * | 8/2002 | Watanabe et al. | 369/47.51 |
| 2005/0013226 A1 * | 1/2005 | Suzuki | 369/53.24 |

FOREIGN PATENT DOCUMENTS

| JP | 06259789 | 9/1994 |
| JP | 11-250459 | 9/1999 |
| JP | 2000242940 | 9/2000 |
| JP | 2001-357529 | 12/2001 |
| JP | 2003-178452 | 6/2003 |
| JP | 2004014005 | 1/2004 |
| JP | 2004-055115 | 2/2004 |

\* cited by examiner

*Primary Examiner*—Peter Vincent Agustin
*Assistant Examiner*—Aneeta Yodichkas
(74) *Attorney, Agent, or Firm*—Pillsbury Winthrop Shaw Pittman, LLP

(57) ABSTRACT

A parameter acquisition unit acquires parameters of a write strategy corresponding to the type of an optical disk upon which data is to be recorded, and a recording unit irradiates pulse modulated laser light upon the optical disk based upon the parameters of the write strategy acquired by the parameter acquisition unit, and forms marks corresponding to the data to be recorded in order upon the optical disk. A timing setting unit sets a sampling period, using the parameters of the write strategy acquired by the parameter acquisition unit, within the period from after the completion of formation of a mark upon the optical disk to the start of formation of the next mark. And, during this sampling period which has been set, a sampling unit performs sampling of a signal used for servo control, and a sampling servo control unit performs servo control based upon the signal which has been sampled.

4 Claims, 4 Drawing Sheets

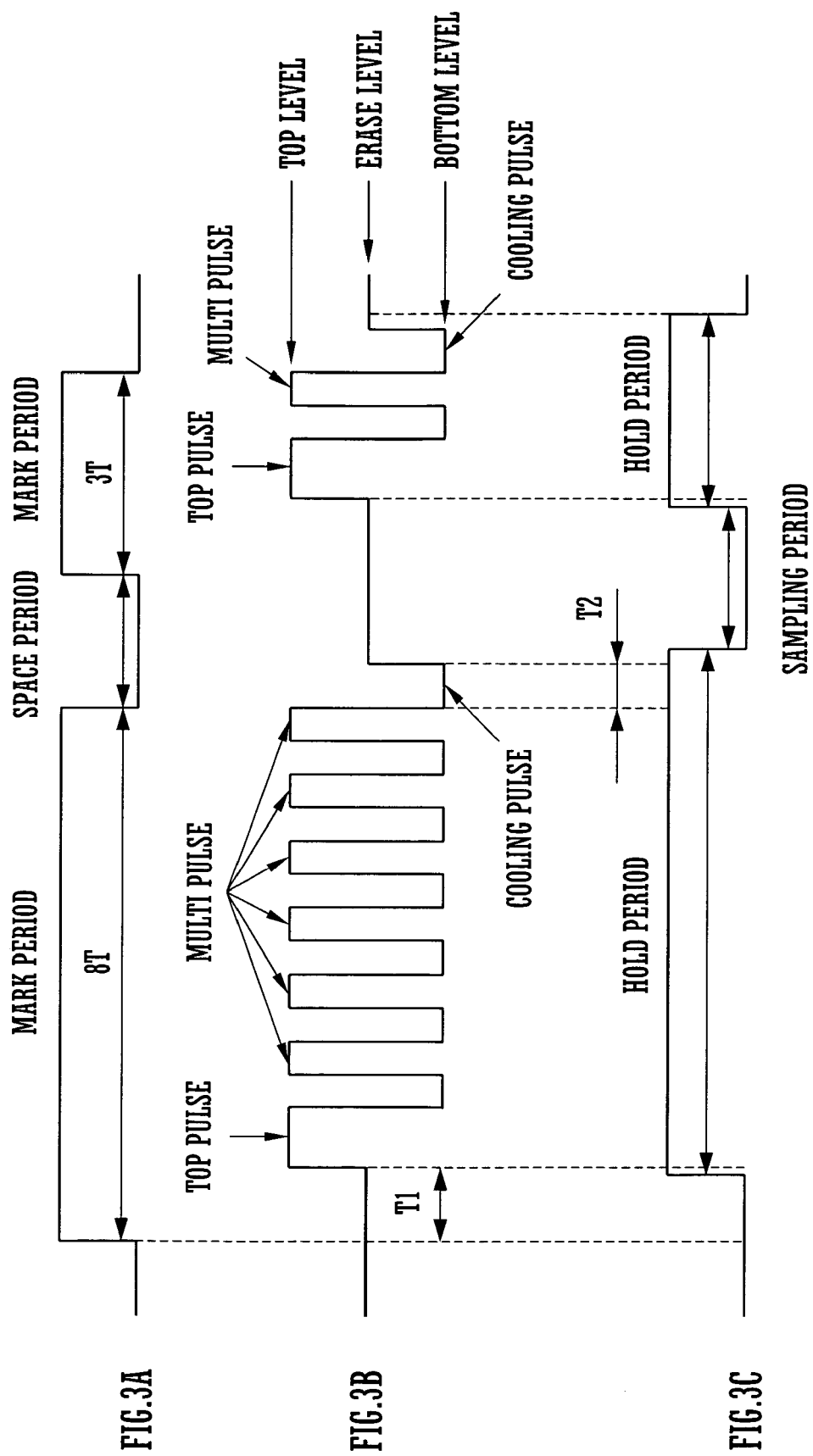

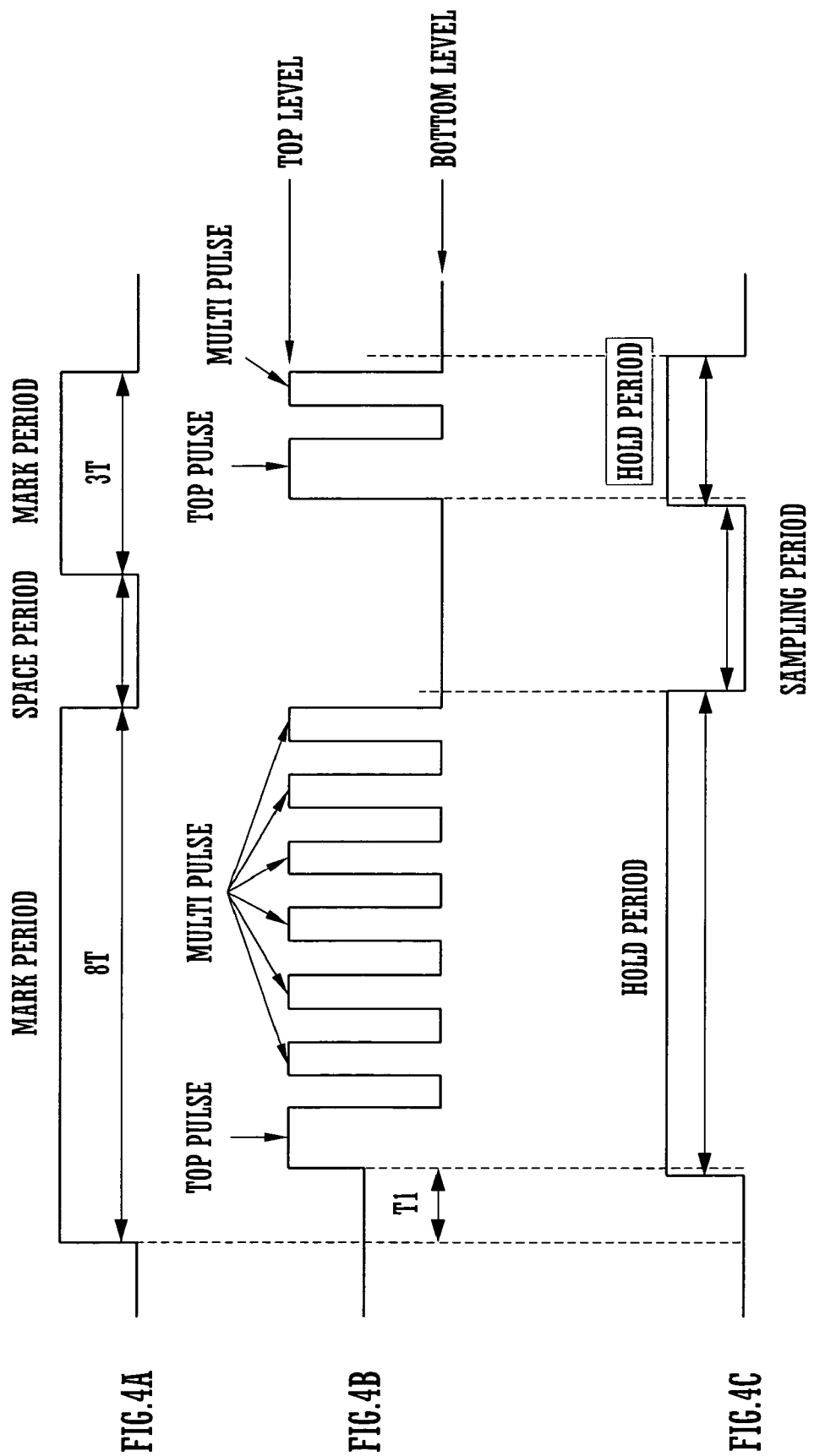

OPTICAL DISK DEVICE

CROSS REFERENCE

This Nonprovisional application claims priority under 35 U.S.C. §119(a) on Patent Application No. 2005-278484 filed in Japan on Sep. 26, 2005, the entire contents of which are hereby incorporated by reference.

BACKGROUND OF THE INVENTION

The present invention relates to an optical disk device which records data upon an optical disk such as a DVD-R, a DVD-RW, a DVD-RAM, a CD-R, a CD-RW, or the like.

Optical disk devices which record data upon recording media are per se generally known and popular. Such a recording medium is an optical disk such as a DVD-RW, a DVD-RAM, a CD-R, a CD-RW, or the like. As is per se well know, the recording process of data upon such an optical disk, marks which correspond to the data to be recorded are formed upon tracks of the optical disk in order. The optical disk device irradiates pulse modulated laser light upon the tracks of the optical disk, and thereby records the data.

Furthermore, with an optical disk device according to the prior art, when recording data upon the optical disk, in order to obtain the optimum recording power of the laser light which is irradiated upon the optical disk, a well known OPC is performed. The laser light is pulse modulated when recording data, as described above. The optimum recording power which is obtained by OPC is the peak power of the laser light which is being pulse modulated. The bottom power (the bias power) of the laser light which is being pulse modulated is the reading power which is irradiated upon the optical disk during normal replay. When recording data, in order to control the power of the laser light which is irradiated upon the optical disk to the optimum power for recording, it is desirable to detect the peak power of the laser light which is actually being irradiated upon the optical disk is detected, and to perform control based upon this detected value. Power control methods for, during recording, controlling the power of the laser light which is being irradiated upon the optical disk to the optimum recording power are disclosed in, for example, Japanese Laid-Open Patent Publication 2003-178452, Japanese Laid-Open Patent Publication H11-250459, Japanese Laid-Open Patent Publication 2001-357529, and Japanese Laid-Open Patent Publication 2004-55115.

Furthermore, when recording data upon the optical disk, the optical disk device performs various types of servo control, such as focus servo control in which the laser light is condensed upon the recording surface of the optical disk, tracking servo control in which the laser light is irradiated upon the center of a predetermined track of the optical disk (the center of the track upon which the marks are formed), and the like. This focus servo control is a type of control in which, based upon a focus error signal which is obtained by detecting the light reflected from the optical disk, an objective lens of the pickup head is shifted to and fro in the direction towards and away from the optical disk. And this tracking servo control is a type of control in which, based upon a tracking error signal which is obtained by detecting the light reflected from the optical disk, the pickup head main part, or the objective lens of the pickup head, is shifted in the radial direction of the optical disk.

With an optical disk device, if, during data recording, the focus servo control or the tracking servo control is performed based upon a focus error signal or a tracking error signal which is sampled at the period at which the laser light, which is being pulse modulated, is irradiated upon the optical disk, then these servo control processes are not performed adequately, and the operation becomes unstable. Thus, with a prior art type optical disk device, the servo control when recording data is performed by so called sampling servo control. This sampling servo control is a type of control in which sampling of the signal which is used in the servo control, such as the focus error signal or the tracking error signal or the like, is started along with the start of the sampling period, and this signal which is used for the servo control is held along with the end of this sampling period. The sampling period is set to be within the period from the completion of formation of one mark upon the optical disk, to the start of formation of the next mark.

However, with a prior art optical disk device, the above described sampling period is fixed, and bears no relationship to the type of the optical disk. For example, the start timing of the sampling period may be set after a first time period which is determined in advance has elapsed from the falling edge of NRZI, which is the recording signal (the end of the mark period), while the end timing of the sampling period may be set after a second time period which is determined in advance has elapsed from the rising edge of NRZI. On the other hand, the optical disk device irradiates the pulse modulated laser light based upon a write strategy, according to the type of optical disk upon which the data is to be recorded. As is per se well known, for each type of optical disk, a write strategy is a specification for the pulse modulation of the output of the laser during recording. Due to this, according to the type of the optical disk upon which the data is to be recorded, there is a period for which the laser light which is being irradiated upon the optical disk is to be pulse modulated. In other words, the optical disk device performs sampling of the signals which are used for servo control, such as the focus error signal and the tracking error signal and the like, at the period at which the laser light which is irradiated upon the optical disk is pulse modulated, according to the type of the optical disk upon which the data is to be recorded.

The object of this invention is to provide an optical disk device with which servo control is performed adequately when recording data, irrespective of the type of optical disk upon which the data is to be recorded.

SUMMARY OF THE INVENTION

The optical disk device of the present invention includes a parameter acquisition unit which acquires parameters of a write strategy corresponding to the type of an optical disk upon which data is to be recorded, and a recording unit which irradiates pulse modulated laser light upon the optical disk based upon the parameters of the write strategy acquired by the parameter acquisition unit, and forms marks corresponding to the data to be recorded in order upon the optical disk. Furthermore, this optical disk device includes a sampling unit which performs sampling of a signal used for servo control during a sampling period which is set within the period from after the completion of formation of a mark upon the optical disk to the start of formation of the next mark, and holds the signal for servo control along with the end of this sampling period, and a sampling servo control unit which performs servo control, based upon the signal sampled by the sampling unit. Moreover, this optical disk device includes a timing setting unit which sets the sampling period, using the parameters of the write strategy acquired by the parameter acquisition unit.

Irrespective of the type of the optical disk upon which the data is to be recorded, the sampling unit can set the sampling period to a period in which the laser light which is being pulse modulated is not present. Furthermore, the sampling period is never shortened so far as to be unusable. Accordingly, irrespective of the type of the optical disk upon which the data is to be recorded, it is possible to ensure a sufficient time period for the sampling of the signal which is used for servo control. As a result, servo control is adequately performed during recording of data with this optical disk device, so that it is possible to anticipate an enhancement of reliability.

BRIEF DESCRIPTION OF THE DRAWINGS

FIGS. 3(A)-(C) show, in a recording signal for an optical disk of a rewritable type, the relationship between a write pulse signal and a sample hold signal; and FIGS. 4(A)-(C) show in a recording signal for an write once optical disk, the relationship between a write pulse signal and a sample hold signal.

DETAILED DESCRIPTION OF THE INVENTION

Figure 1:
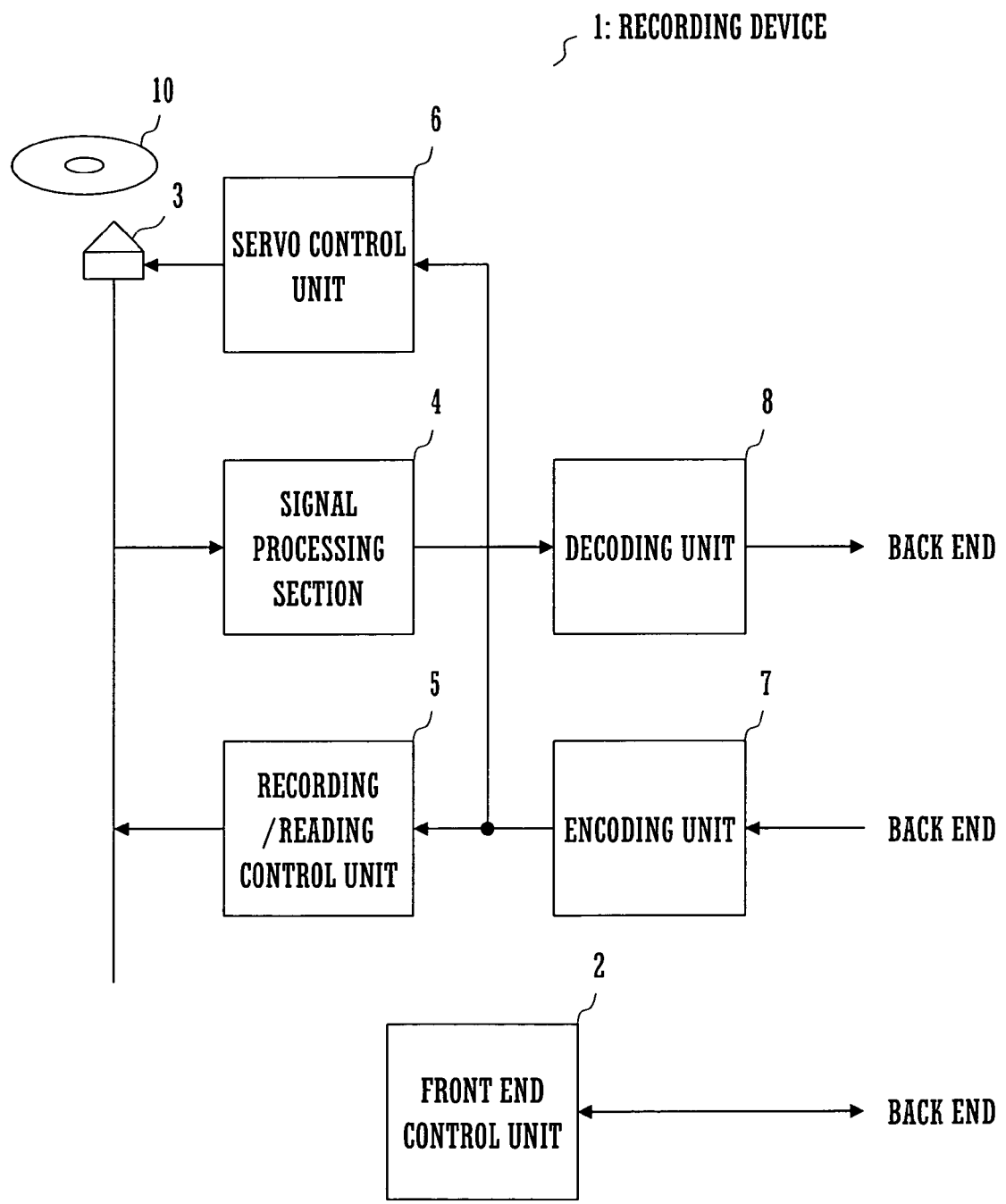
FIG. 1 is a figure showing the structure of the main portion of a recording device which is an embodiment of the present invention.

FIG. 1 is a figure showing the structure of the main portion of a recording device which is an embodiment of the present invention. The recording device 1 of this embodiment comprises a front end control unit 2 which controls the operations of the various portions of the front end side of the device associated with recording data upon an optical disk 10 and reading data from it. Furthermore, the recording device 1 comprises a pickup head 3, a signal processing section 4, a recording/reading control unit 5, a servo control unit 6, an encoding unit 7, and a decoding unit 8. In FIG. 1, the structure of the back end side of this recording device 1 is omitted from the drawing. This back end side has a structure for performing processing for receiving input of data to be recorded upon the optical disk 10, processing for outputting data which has been read from the optical disk 10, and processing for receiving user input operation for the device main part and the like.

For each type of optical disk 10, the front end control unit stores in its memory (not shown in the figures) a write strategy which stipulates the pulse modulation of the output of the laser during recording. Here, by the type of the optical disk 10 is not meant a classification of the optical disks 10 into various types such as DVD-R, DVD-RW, DVD-RAM, CD-R, CD-RW and the like, but rather is a classification according to the type number of the optical disk 10 which is affixed by the maker. Even for optical disks of the same kind, with optical disks which have different type numbers, the composition of the recording surface is different, so that as a result the recording characteristics are different. The front end control unit 2 is connected to a back end control unit (not shown in the figures) which controls the operation of various units on the back end side not shown in the figures, so as to be capable of communication therewith.

The pickup head 3 comprises a light emitting element (LD) which irradiates laser light upon the optical disk 10, a light receiving element (PD) which detects the reflected light from the optical disk 10, and the like. And the pickup head 3 is mounted so as to be freely shiftable in the radial direction of the optical disk 10. The pickup head 3 is shifted in the radial direction of the optical disk 10 by a thread motor not shown in the figures. Furthermore, an objective lens (not shown in the figures) which is provided to the pickup head 3 is mounted upon a two shaft actuator, and, by the operation of this actuator, is shifted with respect to the optical disk 10 in the direction towards and away from the disk, and in the radial direction thereof.

The signal processing section 4 processes the output of the light receiving element which is provided to the pickup head 3, and creates and outputs a focus error signal (FE signal), a tracking error signal (TE signal), a read signal (RE signal), and the like. The FE signal is a signal which indicates the amount of deviation between the recording surface of the optical disk 10 and the condensation position of the laser light which is being irradiated from the pickup head 3. The TE signal is a signal which indicates the amount of deviation between the irradiation position of the laser light which is being irradiated from the pickup head 3 and the center of the track upon the optical disk 10. And the RF signal is a read signal for the data recorded upon the optical disk 10.

During recording of data upon the optical disk 10, the recording/reading control unit 5 performs pulse modulation control and power control of the laser light which the light emitting element of the pickup head 3 irradiates upon the optical disk 10. Furthermore, during reading of data from the optical disk 10, the recording/reading control unit 5 performs power control of the laser light which is irradiated upon the optical disk 10.

The servo control unit 6 performs focus servo control, based upon the FE signal which is inputted from the signal processing section 4, so as to shift the objective lens of the pickup head 3 to and fro in the direction towards and away from the optical disk 10, and tracking servo control, based upon the TE signal, so as to shift the pickup head 3, or the objective lens of the pickup head 3, in the radial direction of the optical disk 10. And the servo control unit 6 comprises drive circuits which drive the thread motor which shifts the pickup head 3 and the two axis actuator which shifts the objective lens of the pickup head 3. Furthermore, the servo control unit 6 also performs servo control so as to control the rotation speed of a spindle motor (not shown in the figures) which rotates the optical disk 10. The rotation speed of the spindle motor is detected by an encoder which is fitted to the rotation shaft of this spindle motor.

During recording, this recording device 1 sets, for the focus error signal and the tracking error signal, the sampling period and the hold period which are inputted from the signal processing section 4, and performs focus servo control and tracking servo control based upon the focus error signal and the tracking error signal which have been sampled in the sampling period. This sampling period and hold period are set using the write strategy for the type of optical disk 10 upon which the data is to be recorded.

The encoding unit 7 encodes the data which is to be recorded upon the optical disk 10. This data to be recorded on the optical disk 10 is inputted to the encoding unit 7 from the back end side not shown in the figure. The encoding unit 7 inputs a recording signal (NRZI) based upon this encoded data to the recording/reading control unit 5 and the servo control unit 6. The recording/reading unit 5 performs control to form marks upon the optical disk 10 according to the recording signal which has been inputted from the encoding unit 7. At this time, the laser light which is irradiated upon the optical disk 10 is laser light which is pulse modulated based upon the parameters of the write strategy which corresponds to the type of the optical disk 10 upon which the data is to be recorded.

The read signal from the signal processing section 4 is inputted to the decoding unit 8. The decoding unit 8 extracts the data which is recorded upon the optical disk 10 from this read signal which it has inputted, and decodes this extracted data. And the decoding unit 10 sends the data which has been decoded to the back end side.

Next, the operation of this recording device 1 which is an embodiment of the present invention-will be explained. Recording of data upon the optical disk 10, and reading of data which is recorded upon the optical disk 10, are performed by the recording device 1 of this embodiment. Since the read process for reading data which is recorded upon the optical disk 10 is the same as in a conventional optical disk device, the explanation will herein be curtailed.

Figure 2:
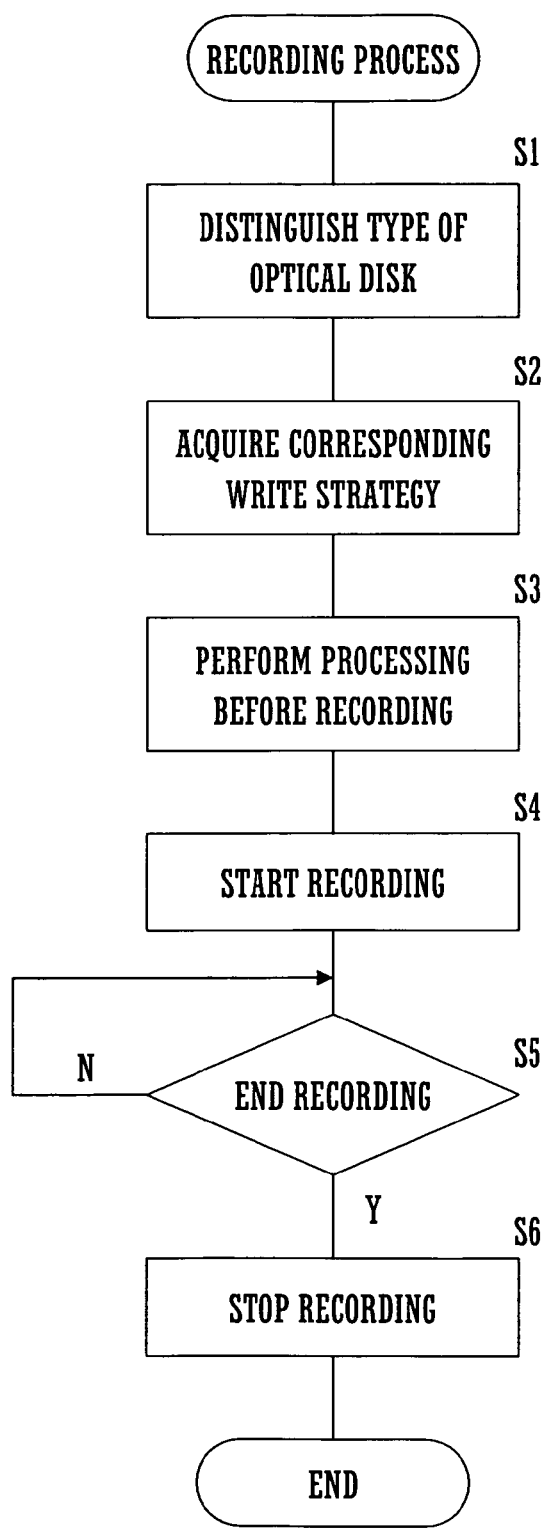
FIG. 2 is a flow chart showing the recording process for recording data upon an optical disk with the recording device of this embodiment of the present invention.

FIG. 2 is a flow chart showing the recording process during recording of data upon an optical disk, with this recording device which is an embodiment of the present invention. This recording device starts the recording process shown in FIG. 2 when a command is issued from the back end side to start recording of data upon the optical disk 10. The recording device 1 decides upon the type of the optical disk which is set, in other words upon the type of the optical disk upon which data is now to be recorded (step S1). In this step S1, the type of the optical disk such as DVD-R, DVD-RW, DVD-RAM, CD-R, CD-RW, or the like is not acquired; rather, information is acquired as to the type number which the maker has assigned to this optical disk 10, and the type of the optical disk 10 is acquired from this information. The information which is acquired by the step S1 is recorded upon the optical disk 10.

When the recording device 1 has distinguished the type of the optical disk 10 in the step S1, it acquires the parameters of the write strategy which corresponds to this type of optical disk 10 which has been distinguished (step S2). The front end control unit 2 stores parameters for the write strategy for each type of optical disk 10 in its memory. In concrete terms, the type numbers of the optical disks 10 and the parameters of their write strategies are stored in the memory in correspondence to one another. The recording device 1 notifies the parameters of the write strategy for this type of optical disk, which have been acquired in the step S2, to the recording/reading processing section 5 and the servo control unit 6. After this, the recording device 1 performs processing before starting recording (step S3). In this step S3, processing is performed for setting the optimum recording power according to the OPC for acquisition, and for setting the pulse modulation of the laser light which is irradiated upon the optical disk 10, and furthermore the sampling period for sampling the focus error signal and the tracking error signal during recording is set and the like. Since OPC is per se well known, the explanation thereof herein will be curtailed.

As is per se well known, recording of data upon the optical disk 10 is a process in which marks corresponding to the data to be recorded are formed in an ordered series upon the optical disk 10. In concrete terms, the recording signal (NRZI) which has been encoded by the encoding unit 7 and which corresponds to the data which is to be recorded upon the optical disk 10 is inputted to the recording/reading processing section 5. In FIG. 3(A), there is shown an example of a recording signal in which the marks 8T and 3T are formed in order upon the optical disk 10. This is a signal in which a mark period of a width which corresponds to the marks which are formed upon the optical disk 10, and a space period which is positioned between two mark periods, are repeated.

Furthermore, FIG. 3(B) is a figure showing the write pulse signal for pulse modulation of the laser light which the recording/reading processing section 5 irradiates upon the optical disk 5, when the recording signal shown in FIG. 3(A) has been inputted. The parameters of the write strategy are values which stipulate, for this write pulse signal, the pulse widths of the top pulse, of the multi pulse, of the cooling pulse, and so on. FIG. 3(B) shows the write pulse signal for a rewritable optical disk (a DVD-RW, a CD-RW, or the like). The recording/reading processing section 5 sets the pulse widths of the top pulse, the multi pulse, the cooling pulse, and so on for the write pulse signal shown in FIG. 3(B), based upon the parameters of the write strategy which was notified from the front end control unit 2 in the step S3. The peak level of the laser light in this write pulse signal is the optimum recording power which was acquired by OPC. Furthermore, its bottom level is the read power when reading data from the optical disk 10. Moreover, a level which is present in a space period between the peak level and the bottom level is the erase level.

Furthermore, FIG. 3(C) is a sampling signal showing, when the recording signal shown in FIG. 3(A) has been inputted, a sampling period over which the focus error signal and the tracking error signal which are inputted by the servo control unit 6 from the signal processing section 4 are sampled, and a hold period over which the focus error signal and the tracking error signal which have been sampled are held. The servo control unit 6 samples the focus error signal and the tracking error signal when this sampling signal is at low level, and holds them when it is at high level. The servo control unit 6 sets the sampling period of the sampling signal shown in FIG. 3(C), using the write strategy which has been notified from the front end control unit 2 in the step S3. In concrete terms, along with setting the start timing of the hold period (i.e., the end timing of the sampling period) by taking the rise of the recording signal as a reference, it also sets the start timing of the timing period (i.e., the end timing of the hold period) by taking the timing of the fall of the recording signal as a reference.

To explain this in more concrete terms, as shown in FIGS. 3(A) and 3(B), the rise of the top pulse in the write signal is delayed by just a time period T1 with respect to the rise of the recording signal. The sum of the time period which occurs due to the response delay of the recording/reading control unit 5 with respect to the rise of the recording signal (hereinafter termed the response delay time period), and the time period by which the rise of the top pulse with respect to the rise of the recording signal stipulated by the write strategy is delayed (hereinafter termed the top pulse delay time period), is almost equal to this delay time period (here, T1). The servo control unit 6 stores the response delay time period of the recording/reading control unit 5. Furthermore, this top pulse delay time period is included in the parameters of the write strategy which is notified from the front end control unit 2. The servo control unit 6 sets the end timing of the sampling period to a timing which is delayed from the rise of the recording signal by a time period of just the sum of the response delay time period and the top pulse delay time period. In the above described time period T1, there is included a slight time period other than the response delay time period and the top pulse delay time period. Accordingly, the end timing of the sampling period is set to a timing which is slightly before the rise timing of the top pulse. In other words, the setting of the end of the sampling period is made to be directly before the laser light which is irradiated upon the optical disk 10 is pulse modulated.

Furthermore, the parameters of the write strategy are determined, not in any relationship with the type of the marks which are formed upon the optical disk 10, but so that the falling timing of the recording signal and the falling timing of the last multi pulse in the write pulse signal approximately agree with one another. Due to this, as shown in FIGS. 3(A) and (B), the falling timing of the recording signal and the falling timing of the final multi pulse in the write pulse signal approximately agree with one another. The servo control unit 6 sets the start timing of the sampling period, with respect to the falling timing of the recording signal, to a timing which is delayed by a time period slightly longer than the time period T2 corresponding to the width of the cooling pulse which is stipulated by the write strategy. By doing this, the start timing of the sampling period is set to a timing which is directly after the irradiation by the cooling pulse has been completed and is maintained at the erase level. In other words, the start of the sampling period is set to directly after the pulse modulation of the laser light which is irradiated upon the optical disk 10 has ended.

In this manner, during the recording of data, according to the type of the optical disk 10 which is set in the device main portion, in other words according to the type of the optical disk 10 upon which the data is to be recorded, the servo control unit 6 is able, while not including the period in which the laser light which is irradiated upon the optical disk 10 is pulse modulated, to set as the sampling period approximately all of the period in which the laser light which is irradiated upon the optical disk 10 is not pulse modulated (i.e. is maintained at the erase level).

When the processing before recording in the step S3 is completed, the recording device 1 starts recording of the data upon the optical disk 10 (step S4). In this step S4, the encoding unit 7 encodes in order the data to be recorded on the optical disk 10, which has been sent from the back end side, and inputs a recording signal based upon this encoded data to the recording/reading control unit 5 and to the servo control unit 6. And the recording/reading control unit 5 irradiates pulse modulated laser light upon the optical disk 10, according to a write pulse signal which has been generated based upon this recording signal which has been inputted from the encoding unit 7. Due to this, marks according to the recording signal are formed in order upon the optical disk 10.

Furthermore, taking the rise timing and the falling timing of the recording signal inputted from the encoding unit 7 as a reference, the servo control unit 6 creates a sampling signal giving the start timing and the end timing of the sampling period set in the step S3. At the start timing given by this sampling signal, the servo control unit 6 starts sampling the signals used for servo control, which are inputted from the signal processing section 4, such as the focus error signal and the tracking error signal and so on. Furthermore, at the end timing given by the sampling signal, the servo control unit 6 stops sampling the signals for servo control and holds. And, during the sampling period, the servo control unit 6 performs focus servo control and tracking servo control based upon the focus error signal and the tracking error signal and so on which are sampled. Furthermore, during the holding period, the servo control unit 6 performs focus servo control and tracking servo control based upon the focus error signal and the tracking error signal and so on which are being held.

Upon notification from the back end side of the end of recording of data upon the optical disk 10 (step S5), the recording device 1 stops the recording of data upon the optical disk 10 which was started in the step S3 (step S5), and terminates this process.

In this manner, with the recording device 1 of this embodiment, during recording of data upon the optical disk 10, the sampling period for sampling the signals for servo control, and the hold period for holding them, are set according to the type of the optical disk 10 upon which the data is to be recorded. Furthermore, with regard to the start timing and the end timing of the sampling period, these are set based upon the parameters of the write strategy which is set for optical disks 10 of the type upon which the data is to be recorded. By doing this, the recording device 1 is able, while not including the period in which the laser light which is irradiated upon the optical disk 10 is pulse modulated, to set as the sampling period approximately all of the period in which the laser light which is irradiated upon the optical disk 10 is not pulse modulated (i.e. is maintained at the erase level). Accordingly, irrespective of the type of the optical disk 10 upon which the data is to be recorded, it is possible to perform servo control in an adequate manner during the recording of the data, so that it is possible to anticipate enhancement of the reliability.

Moreover, while in FIGS. 3(A)-(C) a write pulse signal and a sampling signal were shown by taking a rewritable optical disk 10 as an example, in the case of a write once optical disk 10, the write pulse signal and the sampling signal are signals as shown in FIGS. 4(A)-(C). In the case of a write once optical disk 10, no cooling pulse is present in the write pulse signal, and, during the space period, the laser light which is irradiated upon the optical disk 10 is held at the bottom level. As will be clear from FIGS. 3(A)-(C) and FIGS. 4(A)-(C), it is possible to set the sampling period to be longer in the case of such a write once optical disk 10. This case for a write once optical disk 10 is the same as setting the start timing of the sampling period with the width of the cooling pulse being zero.

Even in the case of recording data upon a write once optical disk 10 in this manner, in the same way as in the above described case of a rewritable optical disk 10, it is possible, while not including the period in which the laser light which is irradiated upon the optical disk 10 is pulse modulated, to set as the sampling period approximately all of the period in which the laser light which is irradiated upon the optical disk 10 is not pulse modulated (i.e. is maintained at the erase level). Accordingly, with a write once optical disk 10 as well, irrespective of its type, it is possible to perform servo control in an adequate manner during the recording of the data, so that it is possible to prevent the operation becoming unstable.

It should be understood that although, in the embodiment described above, the front end control unit 2 stores the parameters of a write strategy for each of the types of optical disk 10, it would also be acceptable to arrange for these parameters of the write strategy to be recorded upon the optical disk 10. In this case, when recording data upon the optical disk 10, the front end control unit is able to acquire the parameters of a write strategy which corresponds to the optical disk 10 upon which the data is to be recorded by reading in from this optical disk 10 the parameters of its write strategy.

Finally, it should be understood that all of the features of the above described embodiment are given by way of example, and are not to be considered as being limitative of the present invention. The range of the present invention is specified, not by any of the features of the embodiment described above, but by the scope of the appended Claims. Moreover, it is intended for the range of the present invention to include equivalents to all of the items in the Claims, and variations upon those items within the scope of the Claims.

What is claimed is:

1. An optical disk device, comprising:
  a memory which stores types of optical disks and parameters of write strategies in correspondence to one another, each of the write strategies stipulating a pulse modulation of an output of a laser during recording;
  a parameter acquisition unit which acquires, from the memory parameters of a write strategy corresponding to a type of an optical disk upon which data is to be recorded;
  a recording unit which irradiates pulse modulated laser light upon the optical disk based upon the parameters of the write strategy acquired by the parameter acquisition unit, and forms, in order upon the optical disk, marks corresponding to the data shown by an inputted recording signal;

a sampling unit which performs sampling of a signal used for servo control during a sampling period which is set within the period from after the completion of formation of a mark upon the optical disk to the start of formation of the next mark, and holds the signal for servo control along with the end of this sampling period;

a sampling servo control unit which performs servo control, based upon the signal sampled by the sampling unit;

a timing setting unit which sets the sampling period, using the parameters of the write strategy acquired by the parameter acquisition unit; and wherein using a parameter of the write strategy related to a cooling pulse, the timing setting unit sets a start timing of the sampling period, to a timing which is delayed from a falling timing of the inputted recording signal by a time period slightly longer than a time period corresponding to a width of the cooling pulse which is stipulated by the write strategy.

2. The optical disk device according to claim 1, wherein, using a parameter of the write strategy related to a top pulse, the timing setting unit sets an end timing of the sampling period, to a timing which is delayed from a rise of the inputted recording signal by a time period slightly shorter than a time period of a sum of a response delay time period and a top pulse delay time period, the response delay time period being a time period which occurs due to a response delay of the recording unit with respect to the rise of the recording signal, the top pulse delay time period being a time period by which a rise of a top pulse is delayed with respect to the rise of the recording signal stipulated by the write strategy.

3. The optical disk device according to claim 1, wherein the recording unit records the parameters of the write strategy upon the optical disk, and the parameter acquisition unit acquires, from the optical disk, the parameters of the write strategy corresponding to the type of the optical disk upon which the data is to be recorded.

4. The optical disk device according to claim 1, wherein the type of the optical disk is a classification according to a type number of the optical disk affixed by a maker.

* * * * *